United States Patent [19]

Kuno

[11] Patent Number: 5,734,382
[45] Date of Patent: Mar. 31, 1998

[54] PORTABLE ELECTRONIC EQUIPMENT HAVING FUNCTION OF DRAWING BOX CHART

[75] Inventor: Michiaki Kuno, Yamatokoriyama, Japan

[73] Assignee: Sharp Kabushiki Kaisha, Osaka, Japan

[21] Appl. No.: 994,313

[22] Filed: Dec. 21, 1992

[30] Foreign Application Priority Data

Dec. 25, 1991 [JP] Japan .................................. 3-343600

[51] Int. Cl.$^6$ ............................................. G06F 15/00
[52] U.S. Cl. ........................................................ 345/440
[58] Field of Search ........................... 395/140, 155, 395/161, 141, 142; 345/23, 24, 125, 133, 134

[56] References Cited

U.S. PATENT DOCUMENTS

| | | |
|---|---|---|
| 4,954,981 | 9/1990 | Dehner, Jr. et al. ................... 364/900 |
| 5,280,567 | 1/1994 | Kobayashi .............................. 395/118 |
| 5,282,266 | 1/1994 | Schnaible et al. ..................... 395/128 |
| 5,283,864 | 2/1994 | Knowlton .............................. 395/158 |

FOREIGN PATENT DOCUMENTS 61-267856  6/1986  Japan .

Primary Examiner—Phu K. Nguyen
Attorney, Agent, or Firm—Nixon & Vanderhye, P.C.

[57] ABSTRACT

A portable electronic device has a function of drawing a box chart for statistical display. The device comprises a keyboard for inputting data, a statistical processor (for determining statistic values by performing a statistical analysis of the statistical data and for producing a box chart from the determined statistic values to visually show a plurality of statistics values as label together), and a display device for displaying the produced box chart with the statistical values, thereby displaying a means value, a maximum value, a minimum value and a standard deviation value as a box chart.

33 Claims, 7 Drawing Sheets

- - - - - Maximum value
------ Mean value +Deviation value
- - - - - Mean value
------ Mean value -Deviation value
- - - - - Minimum value

PORTABLE ELECTRONIC EQUIPMENT HAVING FUNCTION OF DRAWING BOX CHART

BACKGROUND OF THE INVENTION

1. Field of the Invention

The present invention relates to electronic equipment having a statistical analyzing function, and more particularly to portable electronic equipment having a box chart drawing function in which a statistical result is displayed by a graph, such as an electronic functional calculator having statistical analyzing function.

2. Description of the Related Art

Conventionally, a statistical graph displayed by portable electronic equipment having a statistical processing function is mainly directed to a histogram in which an abscissa shows variables and an ordinate shows the number of occurrences, as shown in FIG. 9. The statistical results (including a mean value, a maximum value, a minimum value or a standard deviation value are displayed on another screen different from that of the histogram.

For example, Japanese Patent Laid-Open No. 287856/1986 discloses a graph displaying apparatus which displays a bar graph or a broken line graph of statistical data or contents previously stored in a memory through a simple key operation.

However, the mean value, the maximum value, the minimum value, the standard deviation value or the like can not be displayed on the graph made by the conventional portable electronic equipment. Therefore, it is impossible to visually perceive the distribution of the above data or their correlation.

SUMMARY OF THE INVENTION

The present invention provides a portable electronic equipment having a function of drawing a box chart for statistical display, comprises input means for inputting statistical data, statistical analyzing means for finding statistic values by performing a statistical analysis of the statistical data, means for producing a box chart from the found statistic values to visually show the plurality of statistic values as label together, and displaying means for displaying the produced box chart optionally together with the statistic values.

The box chart producing means preferably includes first producing means for producing one box chart displaying the result of statistical analysis derived from statistical data involving one variable as a parameter, second producing means for producing a plurality of box charts displaying the result of statistical analysis derived from statistical data involving two variables as the parameters, wherein each box chart is produced for every unit section of one parameter, and selecting means for selectively outputting the box chart produced by either the first forming means or the second forming means.

The displaying means preferably acts to display a box chart for visually showing a mean value, a maximum value, a minimum value and a standard deviation value of the statistic data input by the input means.

In addition, the statistical analyzing means preferably acts to find a mean value, a maximum value, a minimum value and a standard deviation value from statistic data input by the input means.

Further, the portable electronic equipment of the present invention preferably includes a ROM storing a program by which the statistic values are found by the statistical operation and a program by which the statistic found by the statistical analyzing means is converted to box chart drawing data, and a RAM storing the statistic values found by the statistical analyzing means and the box chart drawing data.

DESCRIPTION OF THE PREFERRED EMBODIMENTS

Figure 1:
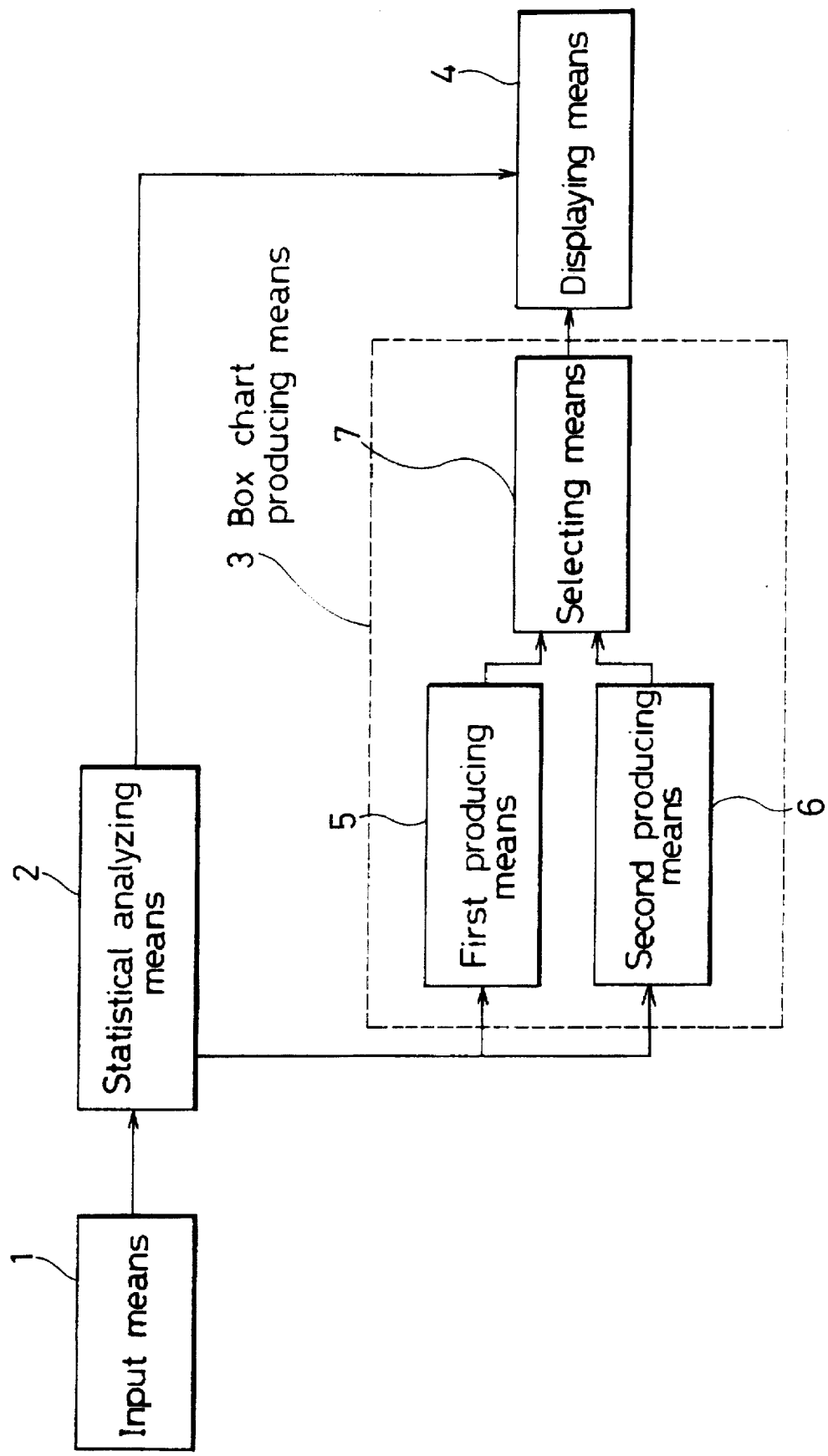
FIG. 1 is a block diagram showing a basic structure of a portable electronic device according to the present invention.

FIG. 1 is a block diagram showing a structure of a portable electric device according to the present invention. Referring to FIG. 1, the present invention provides a portable electronic device having a function of drawing a box chart for statistical display. The device comprises input means 1 for inputting statistical data, statistical analyzing means 2 for finding statistical values by performing a statistical analysis of the statistical data, means 3 for producing a box chart from the found statistic values to visually show a plurality of statistic values as label together, and displaying means 4 for displaying the produced box chart optionally together with the statistical values found by analyzing means 2.

The box chart producing means 3 includes first producing means 5 (for producing one box chart displaying the result of statistical analysis derived from statistical data involving one variable as a parameter), second producing means 6 (for producing a plurality of box charts displaying the result of statistical analysis derived from statistical data involving two variables as the parameters, [wherein each box chart is produced for every unit section of one parameter]), and selecting means 7 (for selectively outputting the box chart produced by either the first forming means or the second forming means).

Further, the portable electronic device of the present invention includes a ROM (for storing a program by which the statistic values are found by the statistical operation and a program by which the statistical values found by the statistical analyzing means 2 are converted to box chart drawing data), and a RAM (for storing the statistical values found by the statistical analyzing means 2 and the box chart drawing data).

Although the input means 1 may be a keyboard, a tablet, a mouse or the like, a keyboard is usually used in such a portable electronic equipment of the present invention.

In addition, although the display means 4 may be a CRT or a liquid crystal display (LCD), an LCD is usually used in the portable electronic equipment of the present invention.

The statistical analyzing means 2 and the box chart producing means 3 usually comprise a CPU in which the statistics processing is performed and the box chart is drawn in accordance with a processing procedure of the program stored in the ROM.

As described above, the present invention provides a portable electronic device having a function of drawing a box chart, which can display the box charts of several kinds of statistics.

Next, an embodiment of the portable electronic device according to the present invention will be described in reference to the drawings.

Figure 2:
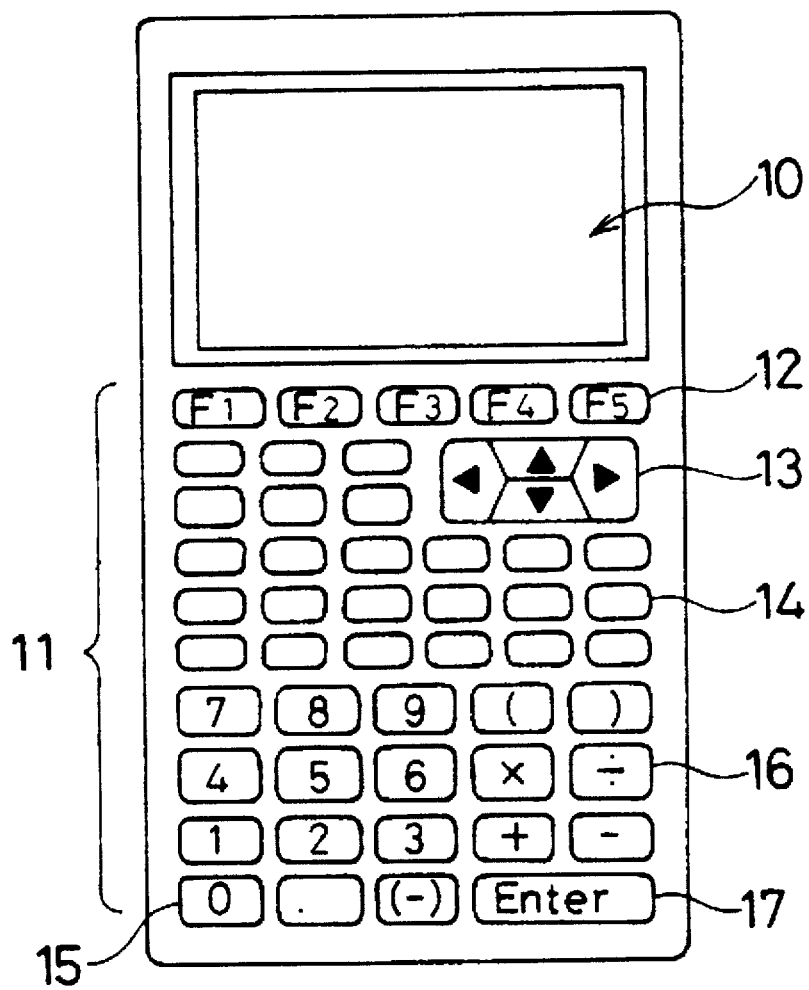
FIG. 2 is a schematic view showing a functional electronic calculator according to an embodiment of the present invention.

FIG. 2 is a view showing a functional electronic calculator as the portable electronic device according to the present invention. Referring to FIG. 2, reference numeral 10 designates a display comprising the LCD, in which statistical results or other processed contents are displayed as both a graphical representation of entered numerical data and an alphanumeric representation of the statistical values determined by the analyzing means 2.

In addition, reference numeral 11 designates a keyboard which consists of function keys 12 assigned to several kinds of statistical functions, cursor keys 13, functional keys 14 such as a sin key or a cos key, numeral keys 15 for inputting numeral data, calculation keys 16, and execution keys for executing several kinds of operation. The function keys F1 to F5 are assigned various functions such as, for example, display of a maximum value, zooming in on a section, resetting, data clearance, and drawing of slots or lines.

Figure 3:
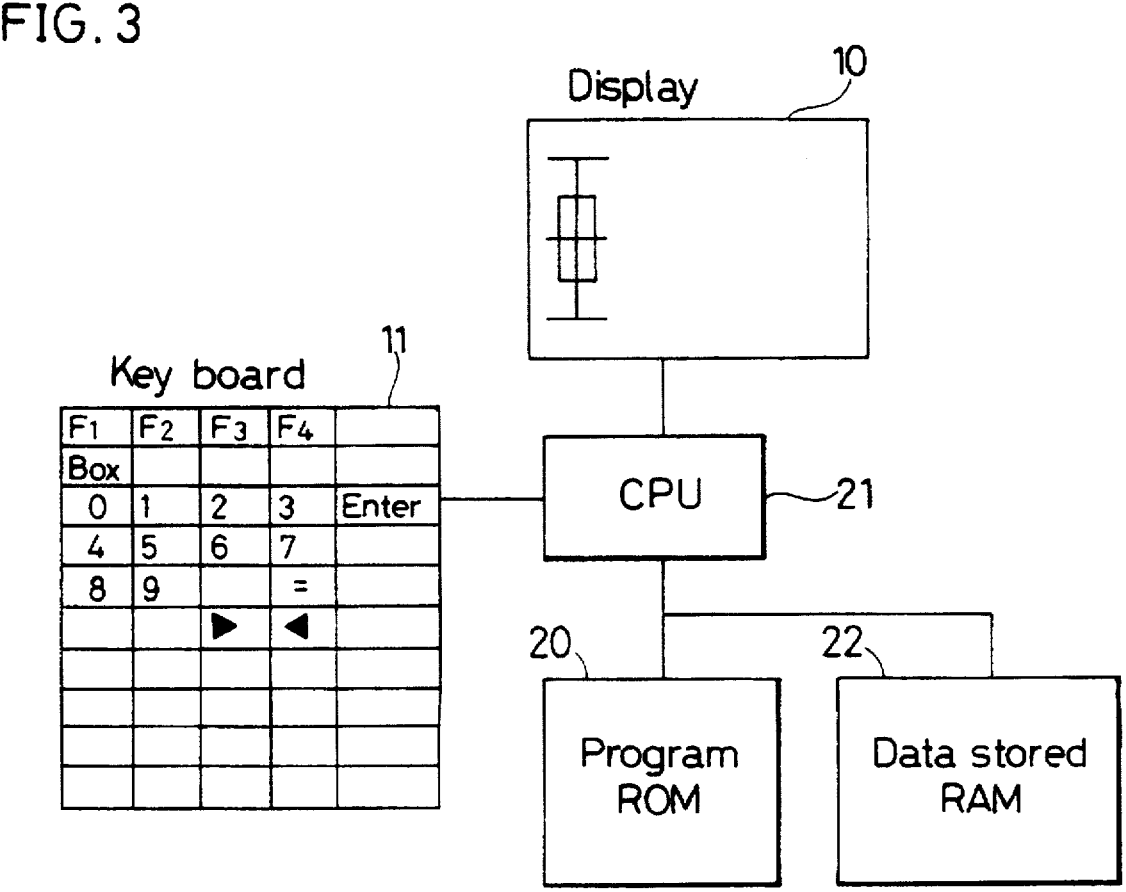
FIG. 3 is a block diagram showing a structure of the functional electronic calculator shown in FIG. 2.

FIG. 3 is a block diagram showing the structure of the functional calculator shown in FIG. 2. Referring to FIG. 2, reference numeral 20 designates a program ROM which stores a program for operating the CPU 21 (that is, a procedure for numerical processing referring to the statistics in the embodiment). Reference numeral 22 designates a RAM which stores, for example, a data result obtained by the statistical processing.

Figure 4:
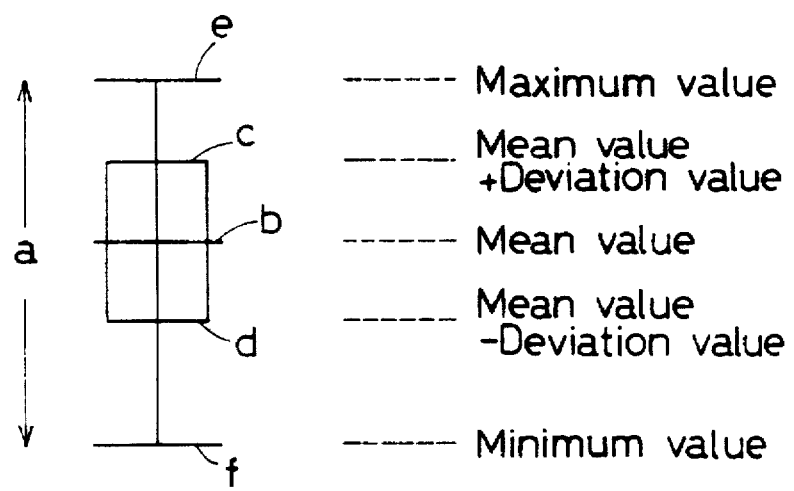
FIG. 4 is a view showing a box chart according to an embodiment of the present invention.

FIG. 4 is a diagram for explaining a box chart to be drawn in the embodiment of the present invention. Referring to FIG. 4, the inputted data values (assumed to be one dimensional in the illustration of FIG. 4) are displayed as a linear segment extending a distance "a" along a first dimension axis. The first dimension axis is parallel to the left and right edges of the sheet of FIG. 4. A plurality of crossbars b–f are also shown in FIG. 4, the crossbars extending in along a second dimensional axis which is perpendicular to the first dimension axis. As shown in FIG. 4, a quadrilateral box is formed by crossbars c and d, as well as by a first vertical line connecting leftmost terminal points of crossbars c and d and a second vertical line connecting rightmost terminal points of crossbars c and d. The significance of the crossbars b–f, each of which represents a statistical value determined by analyzing means 2, will now be explained: ordinates of the box chart, the mean value is shown by a crossbar b and the standard deviation values (the mean value + the deviation value and the mean value − the deviation value) are shown by crossbars c and d, respectively. Furthermore, the maximum value is shown by the highest crossbar e and the minimum value is shown by the lowest crossbar f.

Figure 5:
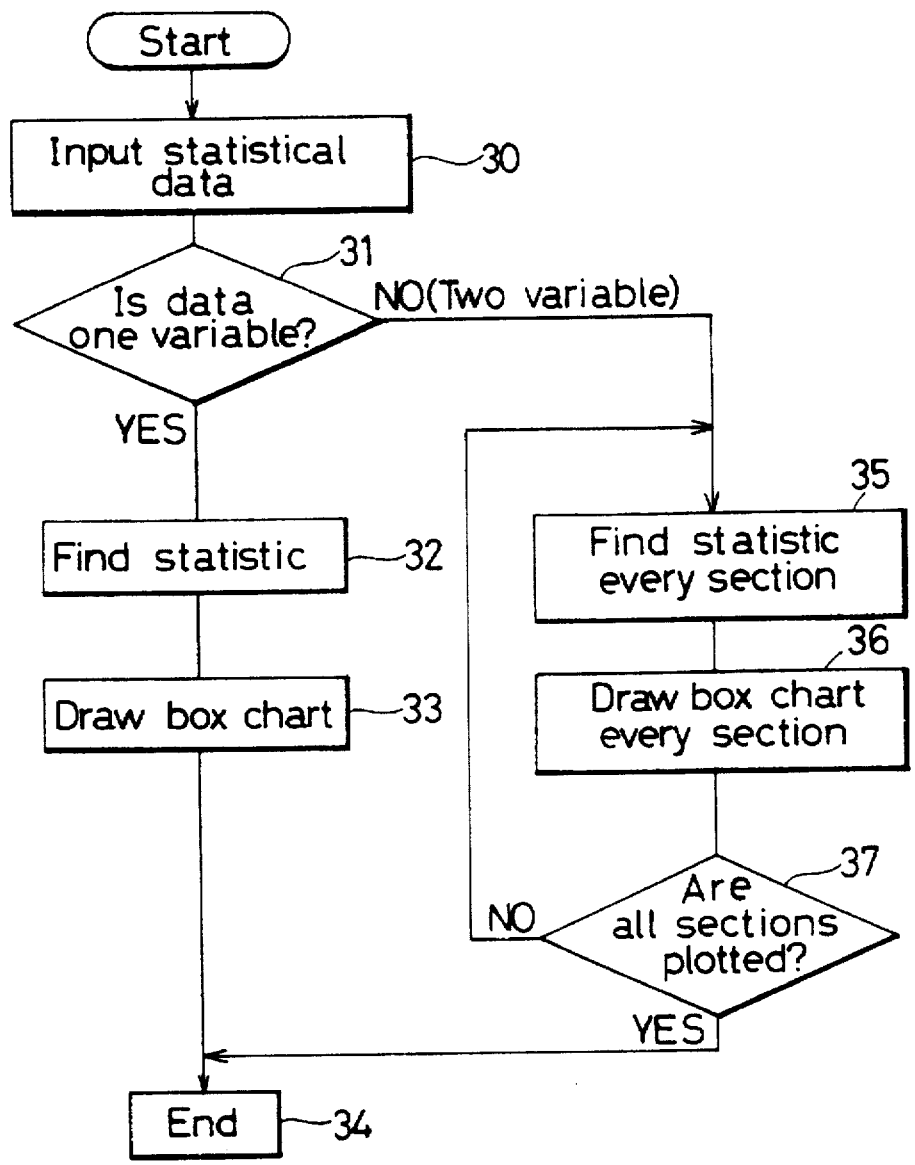
FIG. 5 is a flowchart showing box chart drawing process according to an embodiment of the present invention.

Processing for drawing a box chart by the CPU 21 will be described in reference to a flowchart shown in FIG. 5. The flowchart shows a drawing algorithm for a box chart of one-variable statistics and two-variable statistics.

First, data having one variable or two variables as parameters is input from the key board 11 at step 30. Then, it is determined at step 31 whether the input data is one variable or two variables (e.g.,whether the entered values all have the same or differing values with respect to the second dimension axis). Then, the program proceeds to respective processing steps 32 or 35 for drawing the box chart.

If the data is one variable, its statistical values are determined at step 32. Then, at step 33, one box chart is displayed on a screen in accordance with the determined statistical values and then the drawing process is completed. At this time, a length of the crossbar of the box chart drawn in a case of one variable is fixed. When the statistical values are displayed at the display 10, the number of dots on the screen in proportion to the statistical values found and then a segment of line forming the box chart is drawn.

Alternatively, if the result of step 31, that is, if two-variable data has been input, statistical value are determined by analyzing means 2 (at step 35), and separate box charts drawn (at step 36), for each unit division along the second dimension axis necessary to display the data values entered by an operator. When an axis of abscissas is assumed as time, the section is divided into 24, for example. Then, the box chart is drawn on the screen corresponding to the section in accordance with the statistical values at step 36. A length of the crossbar of the box chart in a case of two variables can be changed. That is its width is determined by the number of divided sections (e.g., the number of unit divisions along the second dimension axis for which box charge must be displayed).

Then, it is determined at step 37 whether the box charts for the whole sections have been drawn. If not, the program returns to step 35 to determine statistical values for the next section. Thus, the processes from step 35 to step 36 are repeated, that is, the process for drawing the box chart is repeated. After box charts for all sections are drawn, the drawing is completed at step 34. Thus, the box chart drawing process is terminated.

Figure 6:
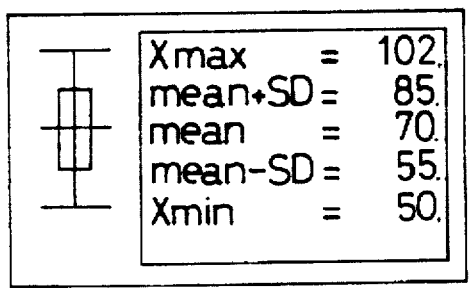
FIG. 6 is a view showing a box chart of one-variable statistics according to an embodiment of the present invention.
Figure 7:
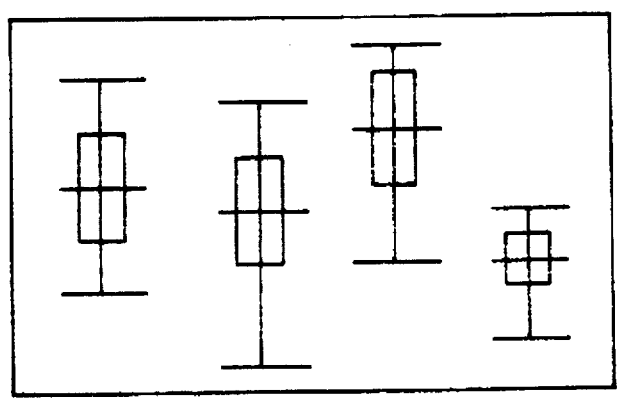
FIG. 7 is a view showing box charts of two-variable statistics according to an embodiment of the present invention.

FIG. 6 is a view showing the aforementioned box chart in the case of one-variable entered data. In the case of the one-variable entered data, only one box chart is drawn. By the side of the box chart, parameter values (e.g., the alphanumeric representation of the statistical values determined by the analyzing means 2) of the box chart are displayed on the same screen. FIG. 7 shows a box chart in the case of the two-variable entered data. In the case of the two-variable entered data, a plurality of box charts are displayed. Therefore, it can be seen how the statistical values for each section (e.g., each unit division of the second dimension axis) changes.

Figure 8:
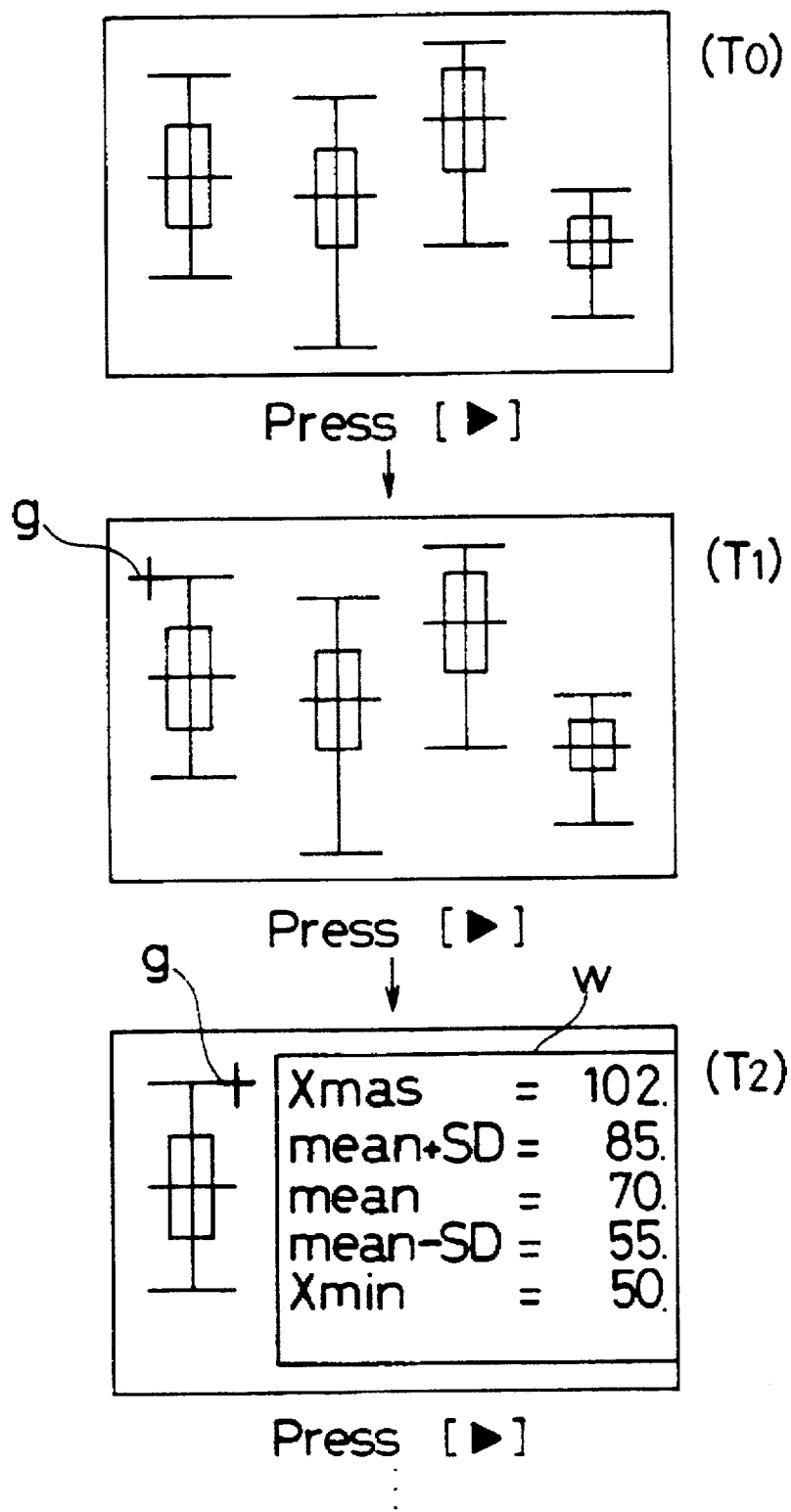
FIG. 8 are views showing box charts of two-variable statistics during tracing according to the present invention.
Figure 9:
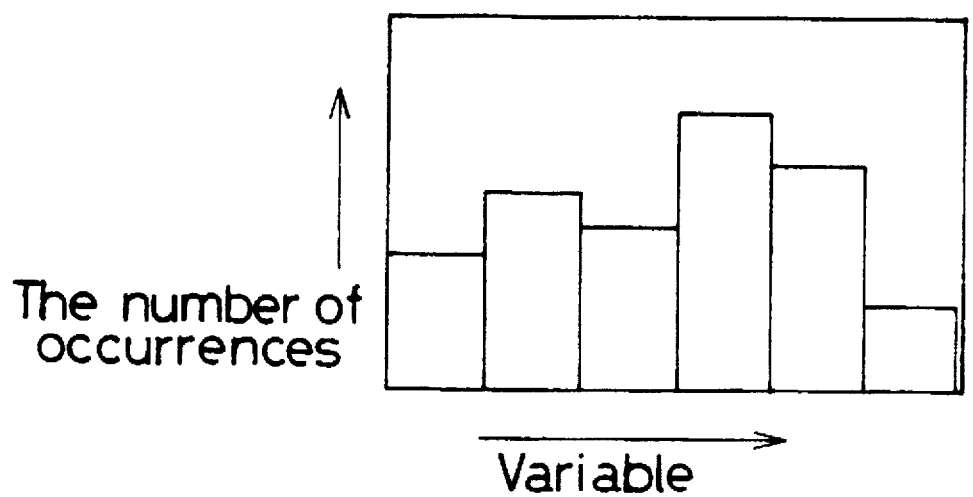
FIG. 9 is a view showing a conventional statistics graph.

FIG. 8 shows box charts in the case of two-variable statistics traced by a cursor. Referring to FIG. 8, when the cursor key 13 in the right direction or in the left direction is pressed during the display of the box charts (TO), a cross-shaped cursor g flashes at the left end of the highest crossbar e of the box chart positioned on the right end or left end side. At this time, as shown in the screen (T1), there is no particular change except for the cursor.

Then, when the cross-shaped cursor g is moved in the right direction, the cross-shaped cursor g is moved to the right end of the highest crossbar e, and as shown in the screen (T2), numeral values designating the values of the box chart where the cross-shaped cursor g is positioned are displayed on the screen as a window display.

Thus, while the cursor is moved in the right direction, when the cursor is positioned at the left upper end of the box chart, only the box chart is displayed and when it is positioned at the right upper end thereof, the statistic of the box chart is displayed in the window w with the box chart.

By the above cursor tracing operation, when the plurality of box charts are displayed on the same screen, respective statistical values can be seen at the same time.

Thus, since the portable electronic device according to the present invention displays the box chart, in the case of the one-variable data, the mean value, the maximum value, the minimum value and the standard deviation value are seen by numeric values and graphic representation at the same time. In the case of the two-variable data, a change in the mean value, the maximum value, the minimum value and the standard deviation value for each section can be readily seen by graphic representation.

While only certain presently preferred embodiments have been described in detail, as will be apparent with those skilled in the art, certain changes and modifications can be made without departing from the scope of the invention as defined by the following claims.

What is claimed is:

1. An electronic device having a function of graphically illustrating a statistical display, comprising:

input means for inputting discrete data values;

statistical analyzing means for determining statistical values by performing a statistical analysis of the inputted discrete data values;

means for producing a box chart from the determined statistical values to visually show a plurality of statistical values; and displaying means for displaying the box chart together with the statistical values.

2. An electronic device according to claim 1, wherein said box chart producing means includes first producing means for producing one box chart displaying the result of statistical analysis derived from data involving one variable as a parameter, second producing means for producing a plurality of box charts displaying the result of statistical analysis derived from data involving two variables as the parameters, wherein each of the plurality of box charts is produced for every unit section of one parameter, and selecting means for selectively outputting the box chart produced by either the first producing means or the second producing means.

3. An electronic device according to claim 1, wherein said displaying means displays the box chart for visually showing a mean value, a maximum value, a minimum value and a standard deviation value of the discrete data values input by said input means.

4. An electronic device according to claim 3, wherein said statistical analyzing means determines the mean value, the maximum value, the minimum value and the standard deviation value from the discrete data values input by said input means.

5. An electronic device according to claim 1, wherein the box chart depicts a quadrilateral geometric shape having a first of its quadrilateral edges corresponding to a first one of the determined statistical values and a second of its quadrilateral edges corresponding to a second one of the determined statistical values, and wherein the box chart further depicts at least one other determined statistical values.

6. An electronic device according to claim 5, wherein the further depicted statistical value is a mean value of the inputted discrete values.

7. An electronic device according to claim 6, wherein the box chart includes a depiction of at least one of the following: (1) the mean value plus a standard deviation from the mean and (2) the mean value minus a standard deviation from the mean.

8. An electronic device having a function of drawing a chart, comprising:

input means for inputting discrete data values;

statistical analyzing means for determining statistical values by performing a statistical analysis of the inputted discrete data values;

means for producing a box chart from the determined statistical values to visually show a plurality of statistical values;

displaying means for displaying the produced box chart together with the statistical values;

a ROM for storing a program by which the statistical values are found by the statistical operation and a program by which the statistical values determined by said statistical analyzing means are converted to box chart drawing data; and a RAM for storing the statistical values determined by said statistical analyzing means and box chart drawing data.

9. An electronic device according to claim 8, wherein the box chart depicts a quadrilateral geometric shape having a first of its quadrilateral edges corresponding to a first one of the determined statistical values and a second of its quadrilateral edges corresponding to a second one of the determined statistical values, and wherein the box chart further depicts at least one other determined statistical values.

10. An electronic device according to claim 9, wherein the further depicted statistical value is a mean value of the inputted discrete values.

11. An electronic device according to claim 10, wherein the box chart includes a depiction of at least one of the following: (1) the mean value plus a standard deviation from the mean and (2) the mean value minus a standard deviation from the mean.

12. An electronic calculator providing for statistically evaluation and statistical display of entered data; the calculator comprising:

a data entry device for entering numerical data;

a processor for evaluating the entered numerical data and for determining statistical values respecting the entered numerical data, the statistical values determined by the processor include at least one of the following: a maximum entered numerical data value; a minimum entered numerical data value; a mean numerical data value; and a standard deviation value determined with respect to the mean numerical data value;

a two dimensional display device having a first dimension axis and a second dimension axis, wherein the display device is driven by the processor to provide a graphical representation of entered numerical data, the graphical representation of entered numerical data including a linear segment extending along the first dimension axis and a statistically-related geometrical shape which intersects the linear segment at at least one intersection point along the first dimension axis, the intersection point being at least one of the statistical values determined by the processor.

13. The electronic calculator of claim 12, wherein the processor further drives the display device to provide an alphanumeric representation of the statistical values determined by the processor, and wherein the graphical representation of entered numerical data and the alphanumeric representation of the statistical values determined by the processor are displayed within a same screen window by the display device.

14. The electronic calculator of claim 12, wherein with respect to entered numerical data values the processor determines a mean numerical data value and a standard deviation value determined with respect to the mean numerical data value; and wherein the intersection point is the standard deviation value.

15. The electronic calculator of claim 12, wherein the processor determines whether values for the entered numerical data are two dimensional and thereby must be represented at differing unit divisions along the second dimension axis, and whereby for two dimensional data for the graphical representation of entered numerical data comprises a plurality of linear segments, each linear segment extending along the first dimension axis, but each of the plurality of linear segments being provided with respect to a different unit division along the second dimension axis, wherein the processor determines statistical values with respect to each of the plurality of linear segments; and wherein for each of the plurality of linear segments the graphical representation also includes a corresponding statistically-related geometrical shape.

16. The electronic calculator of claim 15, wherein the calculator is actuatable so that the display device simultaneously displays two screen windows; wherein the graphical representation is provided in a first screen window; wherein, in response to input at the input device, the processor determines a selected one of the plurality of linear segments for which an alphanumeric representation of the statistical values should be displayed; and wherein the alphanumeric representation for the selected one of the plurality of linear segments is provided in a second screen window which is simultaneously displayable with the first screen window.

17. The electronic calculator of claim 16, wherein the processor determines a selected one of the plurality of linear segments in accordance with the positioning of a cursor on the first screen window.

18. The electronic calculator of claim 12, wherein the data entry device is a keyboard.

19. The electronic calculator of claim 12, wherein the display device is an LCD display device.

20. The electronic calculator of claim 12, wherein the statistically-related geometrical shape is a crossbar.

21. The electronic calculator of claim 12, wherein the statistically-related geometrical shape is a quadrilateral box.

22. An electronic calculator providing for statistically evaluation and statistical display of entered data; the calculator comprising:

a data entry device for entering discrete numerical data and selection information;

a processor for evaluating the entered numerical data and for determining statistical values respecting the entered numerical data and for determining whether values for the entered numerical data are two dimensional;

a two dimensional display device having a first dimension axis and a second dimension axis, wherein the display device is driven by the processor to provide both a graphical representation of entered numerical data and an alphanumeric representation of the statistical values determined by the processor, the graphical representation of entered numerical data including a plurality of linear segments, each linear segment extending along the first dimension axis at a corresponding one of a plurality of differing unit divisions along the second dimension axis;

wherein the processor determines statistical values with respect to each of the plurality of linear segments;

wherein, in response to input of selection information at the input device, the processor determines a selected one of the plurality of linear segments for which the alphanumeric representation of the statistical values should be displayed; and wherein the alphanumeric representation for the selected one of the plurality of linear segments is provided in an alphanumeric screen window which is simultaneously displayable with the a graphic representation screen window in which the graphical representation is provided.

23. The electronic calculator of claim 22, wherein the processor determines a selected one of the plurality of linear segments in accordance with the positioning of a cursor on the first screen window.

24. The electronic calculator of claim 22, wherein the data entry device is a keyboard.

25. The electronic calculator of claim 22, wherein the display device is an LCD display device.

26. The electronic calculator of claim 22, wherein for each linear segment the graphically representation further includes a statistical indicia which intersects the linear segment at least one intersection point along the first dimension axis, the intersection point being at least one of the statistical values determined by the processor.

27. The electronic calculator of claim 26, wherein with respect to each linear segment the processor determines a mean numerical data value and a standard deviation value determined with respect to the mean numerical data value; and wherein the intersection point is the standard deviation value.

28. The electronic calculator of claim 26, wherein the statistically-related geometrical shape is a crossbar.

29. The electronic calculator of claim 26, wherein the statistically-related geometrical shape is a quadrilateral box.

30. A portable electronic equipment comprising:

input means for inputting discrete numerical statistical data;

a statistically analyzing processor for calculating a plurality of statistical values from the statistical data;

producing means for producing at least one box chart from the calculated statistical values, the box chart having a unique shape influenced by the statistical values for visually showing statistical values; and a display for displaying the produced box chart optionally together with the statistical values, wherein said box chart producing means includes:
first producing means for producing a first box chart derived from one variable of the statistical data as a parameter;
second producing means for producing a plurality of second box charts derived from two variables of the statistical data as the parameters, wherein each of the second box charts is produced for every unit section of one variable; and
selecting means for selectively outputting either first box chart or the second box charts.

31. A portable electronic equipment according to claim 30 wherein said statistical value comprises a mean value, a maximum value, a minimum value and at least one standard deviation value.

32. A portable electronic equipment according to claim 31, wherein the box chart comprises:
a vertical axis having a top end and a bottom end; and
a plurality of crossbars, each crossbar being influenced by the statistical values on its position between said top and bottom ends for visually showing each of statistical values.

33. A portable electronic equipment according to claim 32, wherein each crossbar has a width depending upon a number of said unit sections.

* * * * *